July 30, 1963   N. T. FALKENBLAD ET AL   3,099,519
METHOD AND APPARATUS FOR STERILIZING HEAT EXCHANGERS
Filed May 20, 1960   2 Sheets-Sheet 1
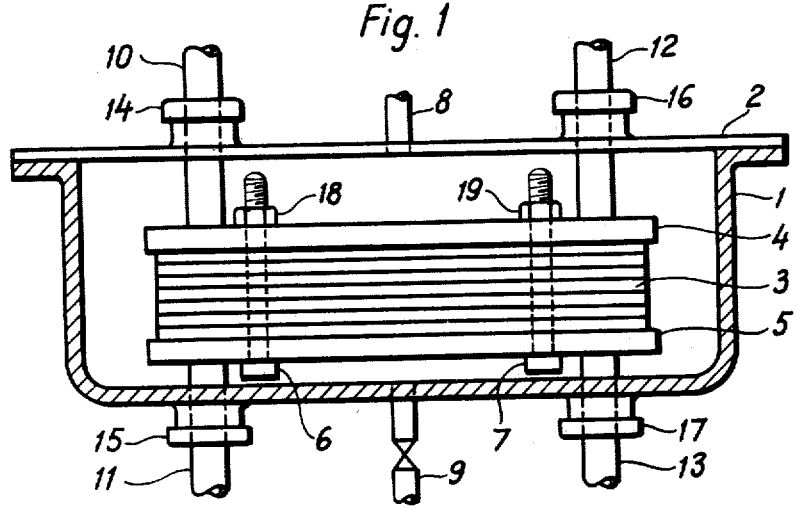
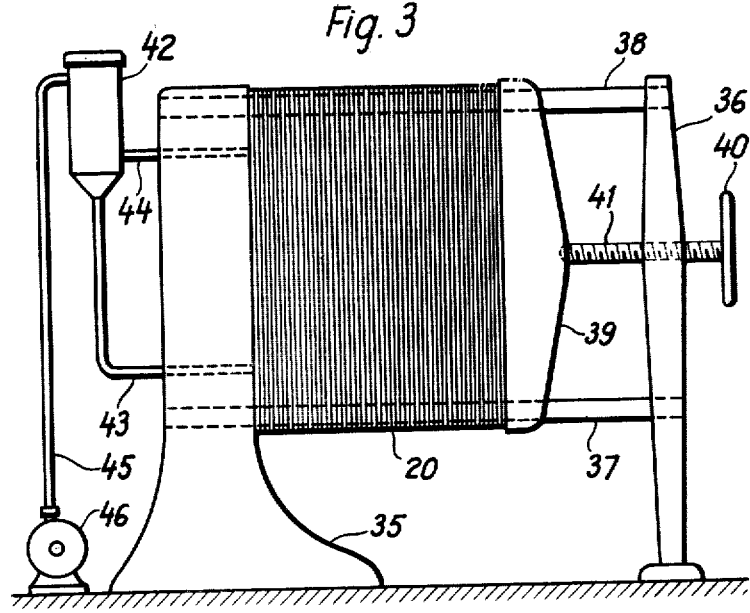
INVENTOR.
Nils T. Falkenblad
Bengt H. Hallström
BY Davis, Hoxie, Faithfull & Hapgood
Attorneys

United States Patent Office 3,099,519
Patented July 30, 1963

3,099,519
METHOD AND APPARATUS FOR STERILIZING HEAT EXCHANGERS
Nils Tore Falkenblad and Bengt Hilding Hallström, Lund, Sweden, assignors to Aktiebolaget Separator, Stockholm, Sweden, a corporation of Sweden
Filed May 20, 1960, Ser. No. 30,577
Claims priority, application Sweden May 27, 1959
12 Claims. (Cl. 21—2)

The present invention relates to heat exchangers and more particularly to a method and apparatus for sterilizing heat exchangers.

In a heat exchanger for heating or cooling liquids, the heat exchange chambers are usually sealed from the outer surroundings by means of packings of rubber, or the like. Occasionally, the heat exchanger must be disassembled for cleaning and sterilization, especially of its heat exchange chambers.

When cooling sterile milk, for example, in a heat exchanger, it has been found that the milk is often reinfected in the apparatus, even though prior to the cooling the apparatus was sterilized by flushing its heat exchange chambers with a strong sterilizing agent (chloramine solution or steam). It has turned out that this reinfection arises from cavities which, when the apparatus is assembled, have enclosed colonies of bacteria which the sterilizing agent has not been able to reach and destroy during the relatively short period of sterilization. The result is that these bacteria survive the sterilization and spread from the cavities into the heat exchange chambers where they infect the milk passing through these chambers.

According to the present invention, this difficulty is avoided by supplying sterilizing agent to a chamber surrounding those packings which seal or delimit the heat exchange chambers. In this way, the colonies of bacteria are attacked from the outside of the packings as well as from the inside.

To obtain a sterile heat exchange (especially in cooling a liquid sensitive to infection), it is advisable to flush the outside of the packings with sterilizing agent while the heat exchange is going on, so as to avoid supply of bacteria from the outside. For this purpose the sterilizing agent is preferably kept at a pressure lower than that in the heat exchange chambers, thereby preventing leakage of sterilizing agent, such as chloramine solution, into the heat exchange chambers.

The sterilization of the heat exchanger, before it is used, is preferably effected by supplying sterilizing agent not only to the chamber outside the packings but also and at the same time to the heat exchange chambers proper. The colonies of bacteria are attacked still more effectively if the various parts of the heat exchanger are loosened from each other sufficiently for the packings to come free from the sealing surfaces, so that all possible locations for bacteria colonies will be flushed by the sterilizing agent.

The heat exchange apparatus of the present invention comprises means forming a chamber surrounding the packings which seal or delimit the heat exchange chambers, this surrounding chamber being adapted to be filled with sterilizing agent. According to one embodiment, the chamber is formed by a container in which the heat exchanger is arranged to be surrounded by the sterilizing agent.

In applying the invention to plate heat exchangers, it is not necessary to arrange a container to surround the whole heat exchanger. In such case it may be sufficient to arrange, outside the regular packing strings or cords of each plate, an additional packing cord which, when the plates are laid against each other, forms with the regular packing cords the chamber to be filled with sterilizing agent. The chambers formed by the various plates and filled with sterilizing agent are preferably in communication with each other, as by providing each plate with holes extending through the plate material and situated between the regular packing cords and the additional cord. In heat exchangers having vertically disposed plates, the plates may each be provided with two such holes, one of which permits supply of a liquid sterilizing agent to the respective chambers and the other of which permits discharge of air therefrom, so that formation of air cushions in the upper parts of the chambers is avoided.

When sterilizing plate heat exchangers in their entirety, that is, including their heat exchange chambers, it is preferable, as indicated above, to provide spacers to keep the plates apart from each other sufficiently so that the regular packings cords no longer make contact with the adjacent plate. This may be done by arranging in the corners of the plates separate projections or heads of deformable elastic material, such as rubber, which in undeformed condition are thicker (that is, project further from the plane of the plate) than the regular packing cords. Another way of accomplishing this is to make the additional packing cord, in undeformed condition, thicker than the regular packing cords. In either case, the projections or the additional packing cord are made of a soft and easily deformable material so that, when assembling the apparatus, they can be compressed into the same thickness as the regular packing cords.

The invention is described more in detail below, reference being made to the accompanying drawings, in which:

FIG. 1 is a vertical sectional view of one form of the new heat exchange apparatus;

FIG. 3 is a side elevational view of a plate heat exchanger embodying plates similar to that shown in FIG. 2.

Figure 2:
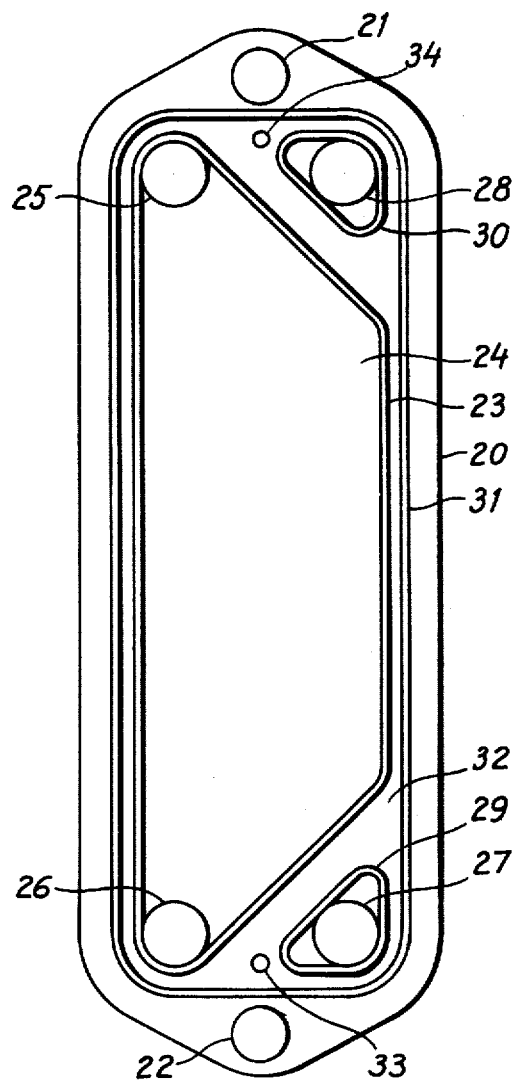
FIG. 2 is a face view of a heat exchange plate for use in another form of the apparatus, showing the usual packing cords surrounded by the additional packing cord.

In the following detailed description, it is assumed for the purpose of illustration that the fluid to be cooled is milk.

In FIG. 1, reference numeral 1 designates a container provided with a cover 2 and forming a closed chamber. Within the container 1—2 is a pack of heat exchange plates 3 which is held compressed between two heavy plates 4 and 5 by bolts 6 and 7. The container is adapted to be filled with sterilizing liquid so that the heat exchanger 3–5 is completely immersed in this liquid. Pipes 8 and 9 are permanently connected to the cover and to the bottom of the container, respectively. Sterilizing liquid is supplied through the pipe 8 to a level which completely covers the heat exchanger 3–7, and, when required, the same liquid is drawn off through pipe 9. Pipes 10, 11, 12 and 13 lead to the heat exchanger 3–7, the pipes 10 and 12 extending through cover 2 and the pipes 11 and 13 extending through the container bottom. Two of these pipes, such as pipes 10 and 13, lead the milk to and from the heat exchanger, while the other two pipes lead the cooling medium to and from the exchanger. The pipes 10–13 are sealed externally against leakage by means of packings 14, 15, 16 and 17, respectively, secured to the container 1—2 around these pipes. When required, these pipes can be disconnected from the heat exchanger plates 4—5 and withdrawn from the container through the respective packings 14–17. While the heat exchange plates are in horizontal position in FIG. 1, they may be arranged vertically whereby the removal of the air bubbles from the heat exchange chambers is facilitated. This is desirable because air cushions in these chambers have a disturbing effect on the sterilization.

When the apparatus of FIG. 1 is to be sterilized, the nuts 18 and 19 are loosened on bolts 6—7 (as by removing cover 2), so that the heat exchange plates 3 are forced apart from each other and from the usual packing cords by one of the expedients previously described for this purpose. In this way, the sterilizing liquid can reach all the necessary areas of the heat exchanger parts. With the container closed by cover 2, this liquid is introduced through pipe 8 so as to fill the container and completely immerse the heat exchanger 3–7. Upon completion of the sterilization, the nuts 18—19 are tightened to compress the plates 3 together in the pack, the sterilizing liquid is drained from the heat exchange chambers through the valved pipes 11 and 13, and the heat exchange chambers are flushed clean by means of sterile water fed through pipes 10 and 12. Sterilized milk can then be passed through the heat exchanger for cooling. During the cooling, the sterilizing liquid may be retained in the container 1, and the pipe 8 may be connected to a vacuum source (not shown) if it is desired to maintain a lower pressure in container 1 than in the heat exchange chambers of the heat exchanger.

In FIG. 2, we have shown a modified heat exchange plate 20 having the usual holes 21 and 22 for receiving the plate-carrying bars of the heat exchanger frame, these bars being shown at 37—38 in FIG. 3. A packing cord 23 delimits a chamber 24 into which hot milk is assumed to enter through a hole 25 and leave through a hole 26. Cooling liquid is assumed to be led through a hole 27 to a heat exchange chamber on the back of the plate and be led off from this chamber through a hole 28. On the front side of the plate the holes 27 and 28 are sealed against the surroundings by means of packing cords 29 and 30. An additional packing cord 31 delimits, together with the cords 23, 29 and 30, a chamber 32 which is filled with sterilizing agent through a hole 33. Air present in the chamber 32 evacuates through a hole 34 when sterilizing agent is supplied. While cooling is going on, the chamber 32 may be kept filled with sterilizing agent. The cord 31, which is of elastic deformable material, is normally thicker than the cords 23, 29 and 30 so that when the pressure keeping the plates pressed against each other is reduced, slots are formed between the latter cords and the plate surfaces. When it is desired to sterilize the heat exchange chambers, it is necessary only to reduce the compression of the plates enough so that these slots are formed but the chambers 32, by means of the cords 31, are sealed from the outside. Sterilizing agent can then flow into the heat exchange chambers and sterilize them.

The heat exchanger shown in FIG. 3 includes a series of plates 20 (FIG. 2) arranged vertically in a pack. A frame 35 and a supporting column 36 support the horizontal carrying bars 37 and 38 for the plates 20, which are held compressed between the frame 35 and a pressure plate 39 by means of a tightening screw 41 operable by a wheel 40. For the sake of simplicity, the inlets and outlets for milk and cooling liquid are not shown. From a container 42, sterilizing liquid flows downward through a pipe 43 into the plate chambers 32 (FIG. 2), more exactly through the holes 33. The air discharging through the holes 34 passes through a pipe 44 into the container 42 and rises therein to the liquid level. During the cooling of milk, the liquid in the container 42 (and thus the liquid in the chambers 32) is preferably kept under partial vacuum by means of a pipe 45 which extends from the upper part of the container 42 and is connected to a vacuum pump 46.

It will be understood that the chambers 32 between the heat exchange plates 20 may be kept filled with the sterilizing liquid from container 42 while the milk is being cooled by flow through the heat exchange chambers 24, since compression of the plates 20 by screw 41 makes the strings or gaskets 23, 29 and 30 effective to prevent leakage of sterilizing liquid into the milk or the cooling medium, the vacuum source 46 also preventing such leakage.

We claim:

1. In the sterilization of a heat exchanger of the type having heat exchange chambers partly defined by packings under compression between parts of the exchanger, the method which comprises supplying a sterilizing agent in the form of a free-flowing fluid to a closed chamber surrounding said packings externally of the heat exchange chambers, and maintaining said surrounding chamber substantially filled with said fluid agent.

2. A method according to claim 1, comprising also the step of effecting heat exchange in the exchanger while said surrounding chamber is substantially filled with the sterilizing agent.

3. A method according to claim 1, comprising also the step of effecting heat exchange in the exchanger while said surrounding chamber is substantially filled with the sterilizing agent and while maintaining the sterilizing agent at a pressure lower than the pressure in the heat exchange chambers.

4. A method according to claim 1, comprising also the step of supplying sterilizing agent to the heat exchange chambers while said surrounding chamber is supplied with said agent.

5. A method according to claim 1, comprising also the step of reducing said compression and thereby loosening the packings from said parts, whereby sterilizing agent from said surrounding chamber enters the heat exchange chambers.

6. A heat exchanger comprising heat exchange elements, packings defining with said elements a plurality of heat exchange chambers, means forming a closed chamber surrounding said packings and adapted to be filled with a sterilizing agent externally of the heat exchange chambers, and a sterilizing agent in the form of a free-flowing fluid substantially filling said surrounding chamber.

7. A heat exchanger according to claim 6, in which said means comprise a closed container in which said elements and packings are located, the exchanger comprising also pipes extending into the container and connected to said elements for separately leading different fluids to and from said heat exchange chambers.

8. A heat exchanger according to claim 6, in which said elements are heat exchange plates, said packings being normal cords associated with each plate, said means comprising an additional packing cord surrounding said normal cords of each plate, said additional cords, normal cords and plates forming a chamber surrounding each heat exchange chamber and adapted to receive said agent.

9. A heat exchanger according to claim 6, in which said elements are heat exchange plates, said packings being normal cords associated with each plate, said means comprising an additional packing cord surrounding said normal cords of each plate, said additional cords, normal cords and plates forming a chamber surrounding each heat exchange chamber and adapted to receive said agent, the plates having holes interconnecting said surrounding chambers.

10. A heat exchanger according to claim 6, in which said elements are heat exchange plates, said packings being normal cords associated with each plate, said means comprising an additional packing cord surrounding said normal cords of each plate, said additional cords, normal cords and plates forming a chamber surrounding each heat exchange chamber and adapted to receive said agent, the exchanger comprising also an adjustable device for holding the plates and cords compressed in a pack, said device being releasable to allow the normal packing cords to disengage adjacent plates.

11. A heat exchanger according to claim 6, in which said elements are heat exchange plates, said packings being normal cords associated with each plate, said means comprising an additional packing cord surrounding said normal cords of each plate, said additional cords, normal cords and plates forming a chamber surrounding each heat exchange chamber and adapted to receive said agent, the exchanger comprising also an adjustable device for holding the plates and cords compressed in a pack, said device being releasable to allow the normal packing cords to disengage adjacent plates, said additional packing cords being normally thicker than said normal cords, whereby upon release of said device said normal cords disengage adjacent plates while said additional cords remain in contact with the plates.

12. A heat exchanger according to claim 6, in which said elements are heat exchange plates, said packings being normal cords associated with each plate, said means comprising an additional packing cord surrounding said normal cords of each plate, said additional cords, normal cords and plates forming a chamber surrounding each heat exchange chamber and adapted to receive said agent, the heat exchanger comprising also a pipe leading to said surrounding chambers for delivering a sterilizing agent thereto.

References Cited in the file of this patent

UNITED STATES PATENTS

| | | |
|---|---|---|
| 2,156,604 | Payne | May 2, 1939 |
| 2,388,753 | Mallmann | Nov. 13, 1945 |
| 2,449,731 | Therrien | Sept. 21, 1948 |
| 2,623,736 | Hytte | Dec. 30, 1952 |

UNITED STATES PATENT OFFICE
CERTIFICATE OF CORRECTION

July 30, 1963

Patent No. 3,099,519

Nils Tore Falkenblad et al.

It is hereby certified that error appears in the above numbered patent requiring correction and that the said Letters Patent should read as corrected below.

Column 4, line 34, after "packings" insert -- externally of the heat exchange chambers --.

Signed and sealed this 31st day of March 1964.

(SEAL)
Attest:
ERNEST W. SWIDER

Attesting Officer

EDWARD J. BRENNER

Commissioner of Patents